7738X

A. Daris,

Doretailing Machine.

Patented Sep. 6, 1833.

AM. PHOTO-LITHO. CO. N.Y. (OSBORNE'S PROCESS)

Ari Davis of Lancaster Massachusetts
Letters Patent

The Schedule referred to in these Letters Patent and making part of the same, containing a description in the words of the said Ari Davis himself of his improvement in the machine for Dovetailing Boards To all to whom these presents shall come. Be it known that I Ari Davis of Lancaster in the County of Worcester have invented a new and useful machine for dovetailing or locking boards, and that the following is a full and exact description of the said machine as invented by me.

Figure 1:
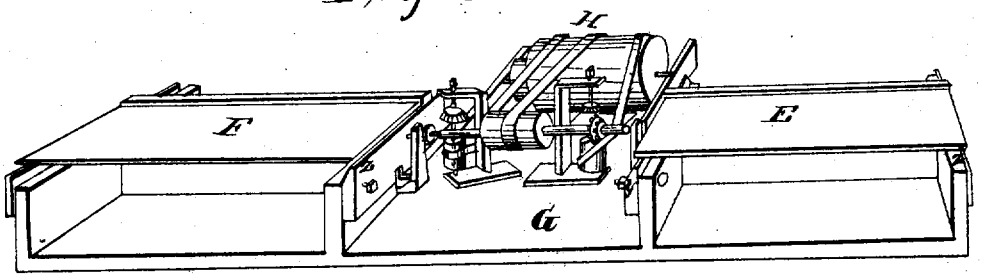

A horizontal Shaft A Fig 1. 2 & 3 of the annexed drawing carries on each end one or more circular saws or cutters. a, b. c. c. while the upright Shaft C. carries the conical cutter d, and the upright Shaft D carries the flat cutter g. and the conical cutter f. E & F are carriages sliding on the ways y. z. the whole being supported by the plank G and all the shafts being belted from the drum H which may be moved by foot, water, or other power. All the shafts as well as the carriage ways are adjustable by screws.

Figure 2:
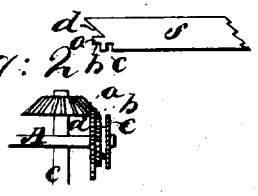
Figure 3:
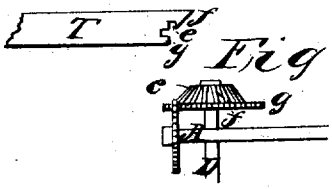
Figure 4:
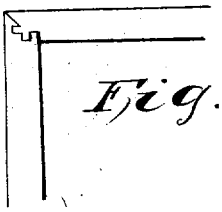

The operation of this machine may be explained as follows. If a board of suitable thickness is laid on the carriage E and passed over the cutters while they are in motion the cutter c fig 2 cuts the groove c (8) along its whole breadth the cutter b, cuts b, a, cuts a, while the conical cutter d. chamfers off the edge, d. If now another board be laid on the carriage F and passed in like manner over the cutters of that end of the machine, the cutter c fig 3. will cut the groove c. while the flat cutter g. cuts the groove g. and the conical cutter f chamfers off the edge f. These boards may now be slipped together breadthwise forming a close dovetail with a mitre joint Fig 4. In working thick boards circular saws running on axes inclined at an angle of about forty five degrees with the plane of the machine may be substituted for the conical cutters. The particular arrangement of the various parts of the machine as before described or that particular form of dovetail is not essential as they may be varied in different ways. The essential principle of the machine is the application of circular saws and cutters to dovetailing or locking boards thro' their whole breadth and this principle he believes to be new and therefore claims as his invention. and not only the machine as before described, but the general application of circular saws and cutters for the purpose of dovetailing or locking boards breadthwise, as before explained Witnesses
Nath^l Rand
Henry Wilder Ari Davis Patented 6 Sept^r 1833

(516 mm) (D. in port folio)